March 6, 1956 M. A. HALVERSON 2,737,399
RETRACTIBLE BALL TYPE TRAILER HITCH
Filed Aug. 28, 1953 2 Sheets-Sheet 2
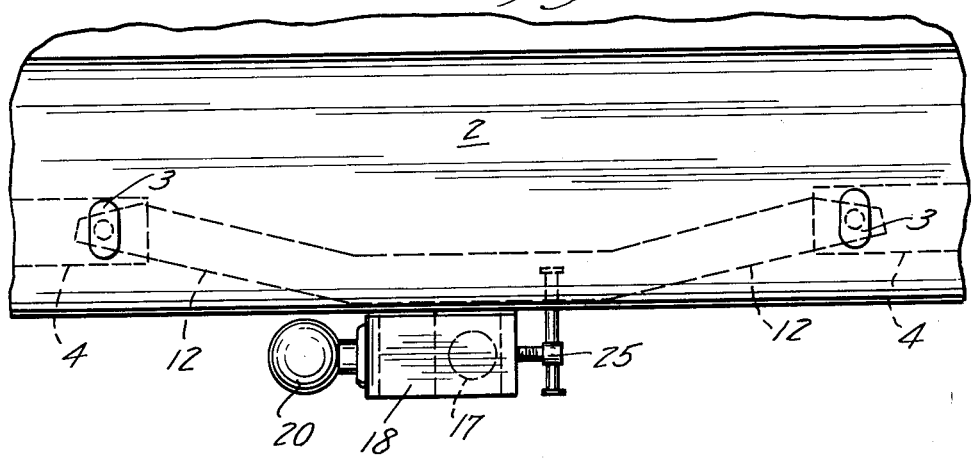
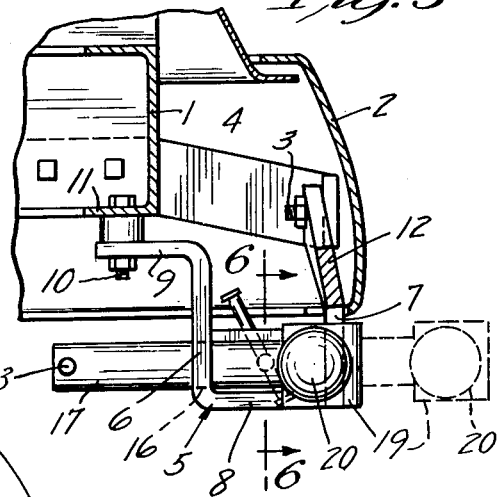
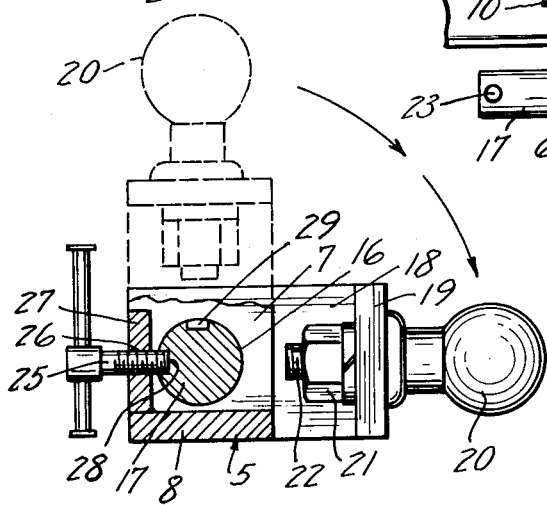
INVENTOR.
Milton A. Halverson
BY
Merchant & Merchant
ATTORNEYS United States Patent Office 2,737,399
Patented Mar. 6, 1956

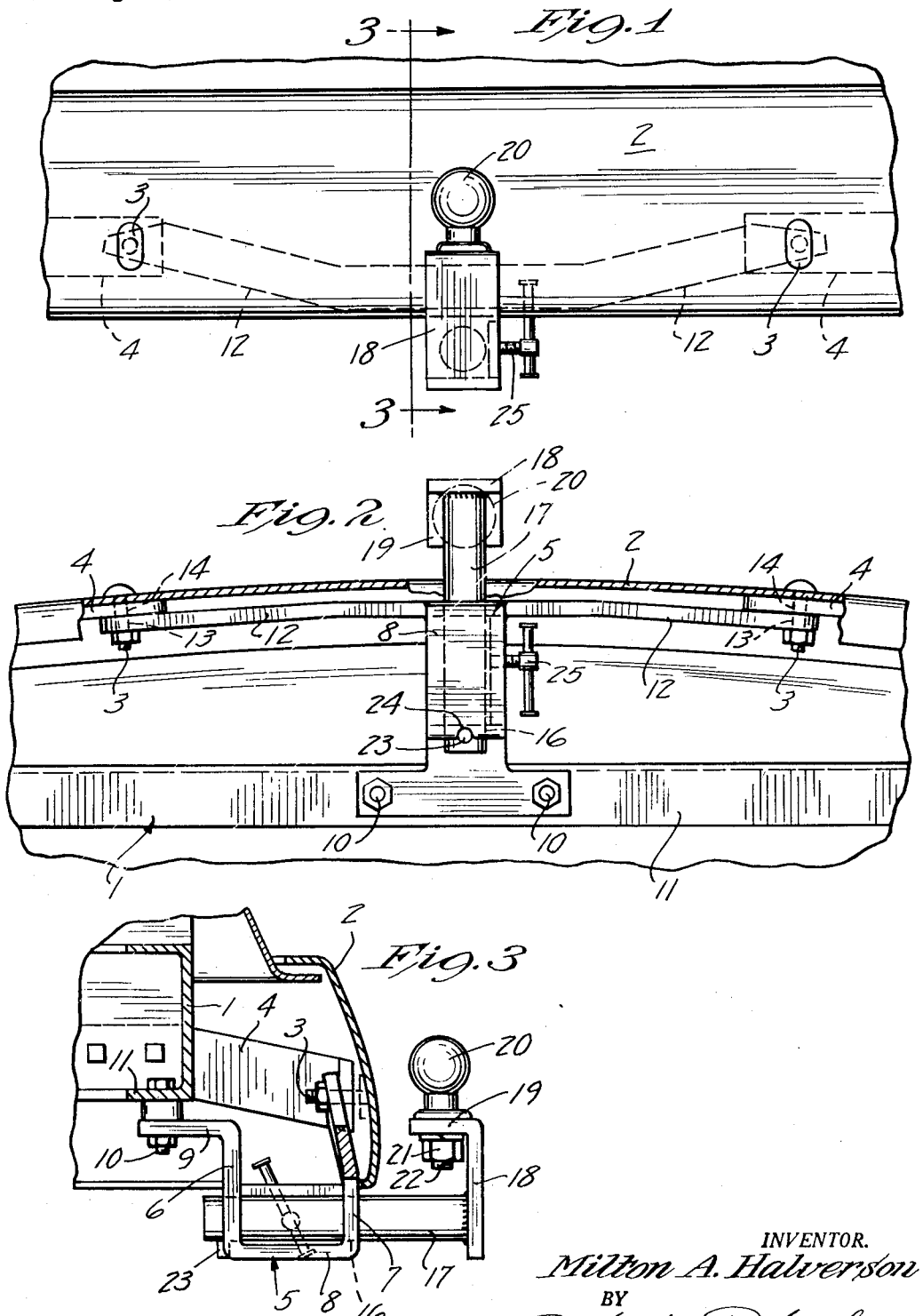

2,737,399

RETRACTIBLE BALL TYPE TRAILER HITCH

Milton A. Halverson, Brainerd, Minn., assignor to Design-Rite Company, Brainerd, Minn., a corporation of Minnesota Application August 28, 1953, Serial No. 377,119

1 Claim. (Cl. 280—491)

My invention relates to trailer hitches for automotive vehicles and more particularly to automotive vehicles of the passenger car type which are equipped with rear bumpers.

The primary object of my invention is the provision of a device of the class described which may be interposed between the frame and the rear bumper of said vehicles and which has a conventional hitch ball mounted in such a manner that it may be readily extended to an operative position rearwardly of the bumper, or retracted to an inoperative position beneath the bumper where it is no longer visible and not subject to being damaged by impact with the front bumpers of other vehicles approaching from the rear.

The further object of my invention is the provision of a device of the class above described which is easy to install, which is rugged and durable in construction, which is extremely easy to operate and which is provided with means for positively locking the hitch ball either in its extended operative position or in its retracted inoperative position.

The still further object of my invention is the provision of a device of the class described which is relatively inexpensive to produce, which has a minimum of working parts and which is not unsightly in appearance.

The above and still further objects of my invention which will become apparent from the following detailed specification, appended claims and attached drawings.

Referring to the drawings, wherein like characters indicate like parts throughout the several views:

Fig. 1 is a view in rear elevation of my novel hitch;

Fig. 2 is a bottom plan, some parts being broken away and some parts shown in section;

Fig. 3 is a transverse section taken on line 3—3 of Fig. 1;

Fig. 4 is a view corresponding to Fig. 1 but showing a different position of some of the parts;

Fig. 5 is a view corresponding to Fig. 3 but showing a different position of some of the parts; and Fig. 6 is an enlarged sectional view taken substantially on the line 6—6 of Fig. 5, some parts being removed.

Referring with greater particularity to the drawings, the numeral 1 indicates a transverse rear end portion of a conventional frame structure of the automotive vehicle, the numeral 2 the rear bumper which is connected to the frame 1 by means of nut-equipped bolts 3 projecting therethrough and through metal straps or bars 4 extended between the frame 1 and bumper 2.

My invention provides a generally U-shaped bracket, identified in its entirety by the numeral 5 and including an upstanding forwardly disposed leg 6, a rearwardly disposed leg 7, a connecting portion 8 and an anchoring lip 9 projecting angularly forwardly from the forward leg 6. As shown, the bracket 5 is adapted to be interposed between the frame 1 and the rear bumper 2 and for the purpose of rigidly securing same in position I provide nut-equipped bolts 10 which project through the laterally spaced aligned openings in horizontal portion 11 of the frame 1 and in the elongated anchoring lip 9 associated with the forward leg 6. For the purpose of securing the rearwardly disposed leg 7 to the bumper 2 I provide arms 12 which project laterally in opposite directions from the upper end portion of leg 7. As shown, the extreme outer end portions of the arms 12 are provided with apertures 13 which align with apertures 14 in the bumper 2 so as to permit the passage therethrough of nut-equipped bolts 3.

As shown, the arms 6 and 7 are provided with horizontally aligned openings 16 which slidably receive a stub drawbar 17 for limited longitudinal sliding movements in a horizontal plane, and for rotary movements about a horizontal axis. Welded or otherwise suitably secured to the rear end portion of drawbar 17 is the leg of an L-shaped bracket 18, having the angular forwardly projected end portion 19 thereof carrying a hitch ball 20. Hitch ball 20 is preferably removable from the drawbar 17 through the medium of a lock-washer-equipped nut 21 having screw threaded engagement with the shank 22 projecting through an opening not specifically numbered in the angular portion 19. Note that the hitch ball 20 overlies the drawbar 17 (see Fig. 3) and is forwardly spaced with respect to the rearwardly projected end of the drawbar 17 and of the vertical portion of the inverted L-shaped bracket.

For the purpose of limiting rearward sliding movements of drawbar 17 I provide a radially projecting pin 23. As shown, particularly in Figs. 2 and 3, the pin 23 is adapted to be received within a notch 24 in the lower end portion leg 2. In this manner the drawbar 17 is likewise held against rotation. For the purpose of locking the drawbar in the extended operative position I provide a locking screw 25 that is screw-threaded through an opening 26 in an upstanding flange 27 extended between the legs 6 and 7. As shown, the inner end of the screw 25 is selectively receivable in recesses 28 and 29 in the drawbar 17 one of which retains it in the operative position of Fig. 3 and the other of which retains it in the inoperative position of Fig. 4.

As above indicated, the extended operative position of my novel hitch is shown in Figures 1 to 3, inclusive. To place it in an inoperative retracted postion, it is but necessary to loosen the screw 25 so that the inner end thereof is removed from the recess 28, thereafter the hitch ball 20 and the drawbar 17 are rotated 90 degrees and the drawbar 17 is pushed forwardly to the limit of its sliding movement, at which point the inner end of the screw 25 will be caused to register with the recess 29. Tightening of the screw 25 will thereafter securely lock the drawbar 17 in its retracted inoperative position below the bumper 2.

My invention has been thoroughly tested and found to be completely satisfactory for the accomplishment of the above objects and while I have shown a preferred embodiment thereof, I wish it to be understood that the same is capable of modification without departure from the scope of the appended claim.

What I claim is:

A trailer hitch having attaching means adapted the hitch to be detachably secured to a vehicle frame and bumper substantially in the horizontal plane thereof, said hitch having a portion depending from said attaching means provided with longitudinally aligned openings disposed below said plane, a drawbar slidably and rotatably mounted in said aligned openings for movement between a rearwardly projecting operative position and a forwardly retracted inoperative position, an L-shaped bracket having a first leg portion thereof secured to the rear end of the drawbar and extending outwardly therefrom and a second leg portion disposed substantially horizontally and projecting forwardly from the outer end of the first leg portion in parallel spaced relation to the drawbar, a hitching ball removably secured to the free forward end of the second leg portion and disposed thereon completely forwardly of the rear end of the drawbar, said first and second leg portions of said bracket retaining said ball forwardly of the rear end of the drawbar in all positions thereof to prevent damage to said ball from impact, said first leg portion being disposed substantially vertically, said second leg portion overlying the drawbar and said ball projecting substantially vertically upwardly from said second leg portion in spaced relation above said plane when the drawbar is in the rearwardly projecting operative position; said first leg portion being disposed substantially horizontally, said second leg portion being laterally offset from the drawbar and said ball projecting substantially horizontally from said second leg portion in spaced relation below said plane in the forwardly retracted inoperative position, restricting means positively limiting rearward movements of the drawbar in said aligned openings, and locking means for locking the drawbar against longitudinal and rotary movements when the drawbar is moved to either of the operative or inoperative positions.

References Cited in the file of this patent
UNITED STATES PATENTS 2,544,185   Sargent _____ Mar. 6, 1951